United States Patent Office 3,372,172
Patented Mar. 5, 1968

3,372,172
PREPARATION OF 2,5-DIACYLAMINO-3,6-DI-AMINO-1,4-BENZOQUINONES
Erhardt Winkelmann, Wolf-Helmut Wagner, and Manfred Schorr, Frankfurt am Main, Germany, assignors to Farbwerke Hoechst Aktiengesellschaft vormals Meister Lucius & Brüning, Frankfurt am Main, Germany, a corporation of Germany
No Drawing. Filed Dec. 12, 1963, Ser. No. 329,956
Claims priority, application Germany, Dec. 20, 1962
F 38,617
7 Claims. (Cl. 260—396)

ABSTRACT OF THE DISCLOSURE

Preparation of 2,5-diacylamino-3,6-diamino-1,4-benzoquinones by reacting the corresponding 3,6-dimethoxy-benzoquinones with dry ammonia in an anhydrous, polar solvent.

---

The present invention relates to 2,5-diacylamino-3,6-diamino-1,4-benzoquinones distinguished by favorable physiological properties and being suitable, especially, as medicaments against coccidiosis, as well as to a process for the manufacture of these substances. The invention further relates to the production of pharmaceutical preparations containing the above-mentioned benzoquinone compounds as active ingredients for the treatment of coccidiosis. The products obtained according to the process of the invention may further be used as herbicides.

The present invention likewise relates to a process for the production of 2,5-diacylamino-3,6-diamino-1,4-benzoquinones of the general formula

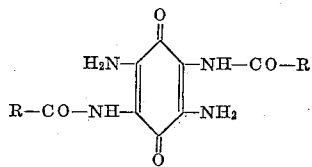

which comprises reacting dry ammonia with 2,5-diacylamino-3,6-dimethoxy-1,4-benzoquinones of the general formula

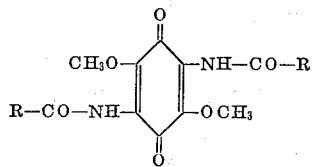

in a solvent or diluent. In each of the above formulae R represents a saturated alkyl radical having up to 5 carbon atoms.

The reaction may be carried out in a simple manner, at low costs, likewise in a large scale production providing very good yields. In contradistinction to previous findings, the smooth course of the reaction and the high purity of the products obtained, are surprising.

The 2,5-diacylamino-3,6-dimethoxy-1,4-benzoquinones used as starting substances in the process of the present invention, especially the diacetyl-, dipropionyl-, dibutyryl-, diiso-butryl-, divaleryl- and diiso-valeryl-amino compounds, may be obtained from 2,3,5,6-tetra-halogen-1,4-benzoquinones such as chloranil or bromanil, by converting these compounds in a first reaction phase with sodium-methylate into 2,3,5,6-tetra-methoxy-1,4-benzoquinone and in a second reaction phase with ammonia into 2,5-diamino-3,6-dimethoxy-1,4-benzoquinones, whereupon the amino group is acylated according to known methods, for instance, by reaction with corresponding carboxylic acid anhydrides.

According to the present invention, the corresponding 2,5-diacylamino-3,6-dimethoxy-1,4-benzoquinone is dissolved or suspended in an anhydrous, preferably a polar solvent. Preferably the organic solvent is applied in an amount of 10 to 100 times the amount of the benzoquinone. As solvents are used, for example, alcohols such as ethanol propanol, isopropanol, butanol, isobutanol, amyl alcohol, iso-amyl alcohol, cyclopentanol, cyclohexanol, benzyl alcohol, furthermore ethers such as ethylene-glycol-monoalkyl ethers, particularly ethylene-glycol-monomethyl-ether, ethylene-glycol-monoethyl ether, furthermore cyclic ethers such as tetrahydrofurane and dioxane, or aliphatic-aromatic ethers, for instance, anisol, likewise nitriles such as acetonitrile, propionitrile or butyronitrile, favorably nitro compounds of the type of nitrobenzene or amides such as N-alkyl- and N,N-dialkyl-formamides, especially N,N-dimethyl- and N,N-diethyl-formamide or acetamide, likewise N-alkyl-acetamides, particularly N-methyl- and N-ethyl-acetamide or N-alkylated cyclic amides such as N-alkyl-pyrrolidones, especially N-methyl-pyrrolidone.

Dry ammonia is suitably introduced into the solution or suspension of the reactant. It is, however, also possible to introduce the corresponding 2,5-diacylamino-3,6-dimethoxy-1,4-benzoquinone into the anhydrous solvent or dispersing agent already saturated with ammonia. The ammonia is previously dried in the usual manner, for instance, by conducting it over a solid alkali metal hydroxide. Generally, the reaction temperature used is within a range from 80–200° C., advantageously 120–160° C.

If the boiling point of the solvent or dispersing agent used is below the reaction temperature, the reaction is carried out in a closed system, for instance a sealed tube or an autoclave. In solvents possessing a high dissolving power for the starting substances, for example, in dimethyl-formamide, the reaction according to the invention occurs with sufficient velocity already at room temperature. It is, however, of advantage to accelerate the reaction likewise in these cases by raising the temperatures.

According to the type of starting material and the reaction temperature, the reaction periods amount from about a few minutes to several hours.

Generally, upon termination of the reaction or on cooling of the reaction mixture, the products crystallize and can be isolated in the usual manner. If desired, they can be purified by recrystallization from appropriate solvents such as nitrobenzene.

The products obtained according to the invention are valuable medicaments. They are particularly suitable for the therapy and prophylaxis of poultry coccidiosis. For instance, an addition of 0.025% of 2,5-dipropionyl-amino-3,6-diamino-benzoquinone-1,4 to the food inhibits the disease from breaking out even in the case of a strong infection with 120,000 oocysts (*Eimeria tenella*) per chicken.

If the compounds obtained according to the present invention are applied for the prophylaxis and therapy of coccidiosis, they are advantageously admixed with a solid, inert and well tolerable mass, in which they are homogeneously distributed by means of a mixing device. Preferably, the active substances are administered to the animals in admixture with the food eaten by the animals. In order to attain a satisfactory and uniform distribution, it is suitable to first prepare a preliminary mixture in which the active substances are highly concentrated. In practice, concentrations of 10 to 50%, preferably of about 25%, are applied, inorganic or organic products being used as carriers, for instance, calcium carbonate, meal of various types of grain or dry mycelium from the fermentation of antibiotics. Wheat middlings are especially suitable for the purpose in question. In addition thereto, other substances important in animal nutrition, for instance antibiotics or vitamins may be added to the preliminary mixtures. An appropriate amount of such a preliminary mixture is then mixed with the chicken and hen food so that a uniform distribution is ensured. The food mixture is suitably adjusted to a content of active substance of 0.001 to 0.1%. The following preparation is given as an example of such an animal food:

|  | Kgs. |
|---|---|
| White-fish meal | 3.500 |
| Soya meal | 9.000 |
| Barley coarse meal | 2.500 |
| Maize coarse meal | 20.750 |
| Wheat coarse meal | 10.000 |
| Wheat bran | 2.500 |
| Calcium phosphate | 0.500 |
| Calcium carbonate | 0.500 |
| Mixture of vitamins and mineral salts | 0.750 | admixed with 15 grams of 2,5-dipropionylamino-3,6-diaminobenzoquinone.

The test described below demonstrates the excellent therapeutical efficiency of 2,5-di-(propionylamino)-3,6-diamino-1,4-benzoquinone: 10 chickens, each being one or a few days old (white leghorn) were each infected with 60,000 spored oocysts of *Eimeria tenella* by means of the esophageal sound. The therapeutical treatment was started one day after the infection and continued until the 9th day (once each day). A further group of animals of the same age and also infected but not treated served as a control. The single dose/animal amounted to 0.03 gram/day and was given by means of the esophageal sound. Whereas all the control animals died within the test period, all the treated animals survived and showed an average increase in weight of 52 grams. The autopsy of all the treated animals at the end of the test showed that practically no oocysts were found in the cecum.

The products of the invention, moreover, act as herbicides.

The following examples serve to illustrate the invention but they are not intended to limit it thereto:

*Example 1.—2,5-diacetylamino-3,6-diamino-1,4-benzoquinone*

5 grams of 2,5-diacetylamino - 3,6 - diamethoxy-1,4-benzoquinone are dissolved in 50 cc. of dimethyl-formamide. At 135° C., dry ammonia is introduced in a moderate stream for 1 hour. The product separates out after only a few minutes in a crystalline form. It is allowed to cool and the remaining ammonia is eliminated by introducing nitrogen. The crystalline reaction product is filtered off under reduced pressure, washed with alcohol and ether and dried.

4.2 grams (94% of the theory) of 2,5-diacetylamino-3,6-diamino-1,4-benzoquinone are obtained in the form of dark brown crystals showing a violet surface gloss. The compound does not show a characteristic melting point.

$C_{10}H_{12}N_4O_4$ (molecular weight 252), calculated: C, 47.6%; H, 4.8%; N, 22.2%. Found: C, 47.5%; H, 4.8%; N, 22.4%.

The 2,5-diacetylamino - 3,6 - dimethoxy-1,4-benzoquinone used as starting substance was prepared from 2,5-diamino-3,6-dimethoxy-1,4-benzoquinone by means of acetic acid anhydride.

*Example 2.—2,5-dipropionylamino-3,6-diamino-1,4-benzoquinone*

According to the method described in Example 1, the 2,5-dipropionylamino-3,6-diamino - 1,4 - benzoquinone is obtained in a yield of 80% of the theory in the form of brown crystals showing a decomposition point of 314° C., by starting from 2,5-dipropionylamino - 3,6 - dimethoxy-1,4-benzoquinone.

$C_{12}H_{16}N_4O_4$ (molecular weight 280), calculated: C, 51.5%; H, 6.0%; N, 20.0%. Found: C, 51.5%; H, 6.0%; N, 20.2%.

*Example 3.—2,5-divalerylamino-3,6-diamino-1,4-benzoquinone*

According to the method described in Example 1, the 2,5-divalerylamino-3,6-diamino - 1,4 - benzoquinone is obtained in a yield of 62% of the theory, in the form of brown crystals having a decomposition point of 303° C., by starting from 2,5-divalerylamino-3,6-dimethoxy-1,4-benzoquinone.

$C_{16}H_{24}N_4O_4$ (molecular weight 336), calculated: C, 57.2%; H, 7.2%; N, 16.7%. Found: C, 57.2%; H, 7.2%; N, 16.7%.

*Example 4.—2,5-diacetylamino-3,6-diamino-1,4-benzoquinone*

5 grams of 2,5-diacetylamino - 3,6 - dimethoxy-1,4-benzoquinone are dissolved in 350 cc. of absolute ethanol and dry gaseous ammonia is introduced at about 80° C. with reflux in a moderate stream for 1 hour. After a few minutes a crystalline mass separates. The remaining ammonia is removed by introducing air. The product is filtered with suction, washed with alcohol and ether and dried. 3.8 grams (84% of the theory) of 2,5-diacetylamino-3,6-diamino-1,4-benzoquinone are obtained. The compound does not show a characteristic melting point.

We claim:

1. A process for the manufacture of 2,5-diacylamino-3,6-diamino-1,4-benzoquinones of the general formula

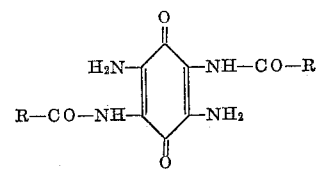

in which R is a saturated alkyl group having up to 5 carbon atoms, which comprises reacting dry ammonia with 2,5-diacylamino-3,6-dimethoxy-1,4-benzoquinone of the general formula

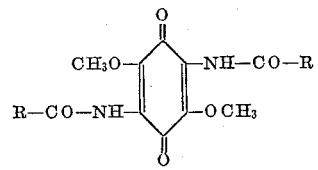

in an anhydrous polar solvent, the substituent R in the formulae being a saturated alkyl radical having up to 5 carbon atoms.

2. A process as defined in claim 1 wherein the solvent is an anhydrous alcohol, glycol ether, cyclic ether, aliphatic ether, aromatic ether, lower nitrile, N-alkyl- or N,N-dialkyl-lower acyl amide, or an N-alkylated cyclic amide.

3. Process as defined in claim 1 wherein the solvent is anhydrous dimethylformamide.

4. A process as defined in claim 1 wherein the solvent is anhydrous ethanol.

5. A process as defined in claim 1 for the manufacture of 2,5-diacetylamino - 3,6 - diamino-1,4-benzoquinone wherein the reactant with dry ammonia is 2,5-diacetylamino-3,6-dimethoxy-1,4-benzoquinone.

6. process as defined in claim 1 for the manufacture of 2,5 - dipropionylamino-3,6-diamino-1,4-benzoquinone wherein the reactant with ammonia is 2,5-dipropionylamino-3,6-diamino-1,4-benzoquinone.

7. A process as defined in claim 1 for the manufacture of 2,5-divalerylamino-3,6-diamino - 1,4 - benzoquinone wherein the reactant with ammonia is 2,5-divalerylamino-3,6-dimethoxy-1,4-benzoquinone.

References Cited

UNITED STATES PATENTS 2,802,001   8/1957   Marxer _____ 260—396

OTHER REFERENCES

Chem. Ber. 90, 1137–1143, Neff et al. (1957).

LORRAINE A. WEINBERGER, *Primary Examiner.*

L. A. THAXTON, *Assistant Examiner.*